US008866455B2

(12) United States Patent
Jeong et al.

(10) Patent No.: US 8,866,455 B2
(45) Date of Patent: Oct. 21, 2014

(54) POWER FACTOR CORRECTION CIRCUIT (71) Applicant: Samsung Electro-Mechanics Co., Ltd., Gyunggi-do (KR)

(72) Inventors: In Wha Jeong, Gyunggi-do (KR); Bum Seok Suh, Gyunggi-do (KR); Hyo Jin Lee, Gyunggi-do (KR)

(73) Assignee: Samsung Electro-Mechanics Co., Ltd., Suwon Gyunggi-Do (KR)

( * ) Notice: Subject to any disclaimer, the term of this patent is extended or adjusted under 35 U.S.C. 154(b) by 50 days.

(21) Appl. No.: 13/781,330

(22) Filed: Feb. 28, 2013

(65) Prior Publication Data
US 2014/0160815 A1 Jun. 12, 2014

(30) Foreign Application Priority Data
Dec. 11, 2012 (KR) ........................ 10-2012-0143967

(51) Int. Cl.
*G05F 1/445* (2006.01)
*G05F 1/70* (2006.01)

(52) U.S. Cl.
CPC ........................................ *G05F 1/70* (2013.01)
USPC ........................................................ 323/272

(58) Field of Classification Search
USPC ......... 323/222, 224, 259, 266, 272, 282, 290, 323/299, 284, 301
See application file for complete search history.

(56) References Cited

U.S. PATENT DOCUMENTS

| 6,548,985 | B1 * | 4/2003 | Hayes et al. | 320/108 |
|---|---|---|---|---|
| 6,714,426 | B1 * | 3/2004 | Guo et al. | 363/25 |
| 7,049,786 | B1 * | 5/2006 | Toliyat et al. | 318/254.1 |
| 7,279,868 | B2 * | 10/2007 | Lanni | 323/222 |
| 7,298,118 | B2 * | 11/2007 | Chandrasekaran | 323/222 |
| 7,489,116 | B2 * | 2/2009 | Lanni | 323/222 |
| 7,518,895 | B2 * | 4/2009 | Shekhawat et al. | 363/89 |
| 7,626,372 | B2 * | 12/2009 | Yang | 323/285 |
| 8,324,871 | B2 * | 12/2012 | Tsai et al. | 323/207 |
| 8,436,593 | B2 * | 5/2013 | Shao et al. | 323/266 |
| 8,653,801 | B2 * | 2/2014 | Shao et al. | 323/222 |
| 8,736,236 | B2 * | 5/2014 | Sun et al. | 323/207 |
| 2011/0199066 | A1 | 8/2011 | Shao et al. | |
| 2014/0119070 | A1 * | 5/2014 | Jeong et al. | 363/45 |

FOREIGN PATENT DOCUMENTS

KR 2011-0105919 A 9/2011

* cited by examiner

*Primary Examiner* — Adolf Berhane
(74) *Attorney, Agent, or Firm* — McDermott Will & Emery LLP (57) ABSTRACT There is provided a power factor correction circuit including: a main switching unit including a first main switch and a second main switch performing a switching operation to regulate a phase difference between a current and a voltage of input power, respectively; a main inductor unit including a first main inductor and a second main inductor accumulating or discharging energy according to a switching operation of each of the first main switch and the second main switch; a snubber switching unit including a first snubber switch and a second snubber switch providing zero-voltage turn-on conditions to the first main switch and the second main switch, respectively; and a controller controlling a switching operation of the main switching unit and the snubber switching unit.

20 Claims, 5 Drawing Sheets

POWER FACTOR CORRECTION CIRCUIT

CROSS-REFERENCE TO RELATED APPLICATIONS

This application claims the priority of Korean Patent Application No. 10-2012-0143967 filed on Dec. 11, 2012, in the Korean Intellectual Property Office, the disclosure of which is incorporated herein by reference.

BACKGROUND OF THE INVENTION

1. Field of the Invention

The present invention relates to an interleaved power factor correction circuit capable of lengthening a life span of an overall system and preventing unnecessary power wastage.

2. Description of the Related Art

Recently, national governments around the world have urged the effective use of energy in conformity with energy efficiency policies, and in particular, effective use of energy in electronic products or home appliances is widely recommended.

Thus, according to such recommendations, a remedial circuit for effectively using energy has been applied to power supply devices supplying power to electronic products, home appliances, and the like.

The remedial circuit may be, for example, a power factor correction circuit. A power factor correction circuit is a circuit for switching input power to adjust a phase difference (power factor) between a current and a voltage of the input power to effectively transfer power to a rear stage.

Among power factor correction circuits, a boost power factor correction circuit has generally been used, but it has relatively low efficiency, high internal currents, voltage ripples, electromagnetic interference (EMI) noise, and the like, and thus, the application thereof to a middle or large-scale power source device may be problematic.

In order to solve these problems, in the case of a related art interleaved boost power factor correction (PFC) circuit configured by connecting boost PFC circuits in parallel, the respective boost PFCs connected in parallel are equally operated with a time difference during a switching period with respect to overall output power, to thereby simultaneously reduce ripples in an input current and those in an output voltage. Accordingly, a size of an input EMI filter can be reduced. However, the interleaved boost power factor correction circuit has a problem in that, even when a load connected to a load stage is relatively light, both of two phases connected in parallel operate, wasting power due to unnecessary switching loss, lowering power factor correction efficiency, and reducing a life span of an overall system.

Among related art documents, Patent document 1 relates to an interleaved PFC flyback converter in which one of switches Q1 and Q2 is switched alone when a light load is detected, but without disclosing a technique of reducing switching loss.

RELATED ART DOCUMENT (Patent document 1) Korean Patent Laid Open Publication No. KR 10-2011-0105919

SUMMARY OF THE INVENTION

An aspect of the present invention provides an interleaved power factor correction circuit providing zero-voltage turn-on conditions to a power factor correction switch and operating with a single phase in case of detecting a light load.

According to an aspect of the present invention, there is provided a power factor correction circuit including: a main switching unit including a first main switch and a second main switch performing a switching operation to regulate a phase difference between a current and a voltage of input power, respectively; a main inductor unit including a first main inductor and a second main inductor accumulating or discharging energy according to a switching operation of each of the first main switch and the second main switch; a snubber switching unit including a first snubber switch and a second snubber switch providing zero-voltage turn-on conditions to the first main switch and the second main switch, respectively; and a controller controlling a switching operation of the main switching unit and the snubber switching unit, wherein the controller may control at least one of a first group set to include the first main switch and the first snubber switch and a second group set to include the second main switch and the second snubber switch according to a current flowing in the main inductor unit.

The controller may control the first and second snubber switches to be in a turned-on state during pre-set first and second durations and the first and second main switches to be turned on when pre-set first and second delay times, starting from the turned-on timing of each of the first and second snubber switches, have lapsed.

The first and second durations may be longer than the first and the second delay times.

The controller may include: a light load detection unit comparing current levels of currents flowing in the first and second main inductors with a current level of a pre-set reference current; and a control signal generation unit generating a control signal for controlling at least one of the first and second groups according to detection results from the light load detection unit.

When the current levels of the currents flowing in the first and second main inductors are equal to or higher than the current level of the reference current, the light load detection unit may generate a heavy load signal, and when a current level of at least one of the currents flowing in the first and second main inductors is lower than the current level of the reference current, the light load detection unit may generate a light load signal.

When the heavy load signal is received, the control signal generation unit may generate a control signal for controlling the first and second groups such that currents flowing in the first and second inductors have a 180-degree phase difference, and when the light load signal is received, the control signal generation unit may control the first and second groups to alternately operate according to a pre-set period.

The power factor correction circuit may further include: a snubber inductor unit including at least one snubber inductor regulating amounts of currents flowing in the first and second snubber switches.

The power factor correction circuit may further include: a diode unit providing a transmission path for power discharged from the main inductor unit according to a switching operation of the main switching unit.

The power factor correction circuit may further include: a smoothing unit stabilizing power transmitted from the diode unit.

The power factor correction circuit may further include: a rectifying unit providing the input power generated by rectifying AC power to the main inductor unit.

According to another aspect of the present invention, there is provided a power factor correction circuit including: a main switching unit including a first main switch and a second main switch performing a switching operation to regulate a phase difference between a current and a voltage of input power, respectively; a main inductor unit including a first main inductor and a second main inductor accumulating or discharging energy according to a switching operation of each of the first main switch and the second main switch; a snubber switching unit including a first snubber switch and a second snubber switch providing zero-voltage turn-on conditions to the first main switch and the second main switch, respectively; and a controller controlling a switching operation of the main switching unit and the snubber switching unit, wherein the controller may control at least one of a first group set to include the first main switch and the first snubber switch and a second group set to include the second main switch and the second snubber switch according to a current flowing in the main inductor unit and a temperature of the main switching unit.

The controller may control the first and second snubber switches to be in a turned-on state during pre-set first and second durations and the first and second main switches to be turned on when pre-set first and second delay times, starting from the turned-on timing of each of the first and second snubber switches, have lapsed.

The first and second durations may be longer than the first and the second delay times.

The controller may include: a light load detection unit comparing current levels of currents flowing in the first and second main inductors with a current level of a pre-set reference current; and a control signal generation unit generating a control signal for controlling at least one of the first and second groups according to detection results from the light load detection unit and a temperature of the main switching unit.

When the current levels of the currents flowing in the first and second main inductors are equal to or higher than the current level of the reference current, the light load detection unit may generate a heavy load signal, and when a current level of at least one of the currents flowing in the first and second main inductors is lower than the current level of the reference current, the light load detection unit may generate a light load signal.

When the heavy load signal is received, the control signal generation unit may generate a control signal for controlling the first and second groups such that currents flowing in the first and second inductors have a 180-degree phase difference, and when the light load signal is received, the control signal generation unit may control one of the first and second groups such that when a temperature of a main switch of one of the first and second groups is higher than a pre-set reference temperature, the control signal generation unit may generate a control signal for controlling the other of the first and second groups to operate.

The power factor correction circuit may further include: a snubber inductor unit including at least one snubber inductor regulating amounts of currents flowing in the first and second snubber switches.

The power factor correction circuit may further include: a diode unit providing a transmission path for power discharged from the main inductor unit according to a switching operation of the main switching unit.

The power factor correction circuit may further include: a smoothing unit stabilizing power transmitted from the diode unit.

The power factor correction circuit may further include: a rectifying unit providing the input power generated by rectifying AC power to the main inductor unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 1:
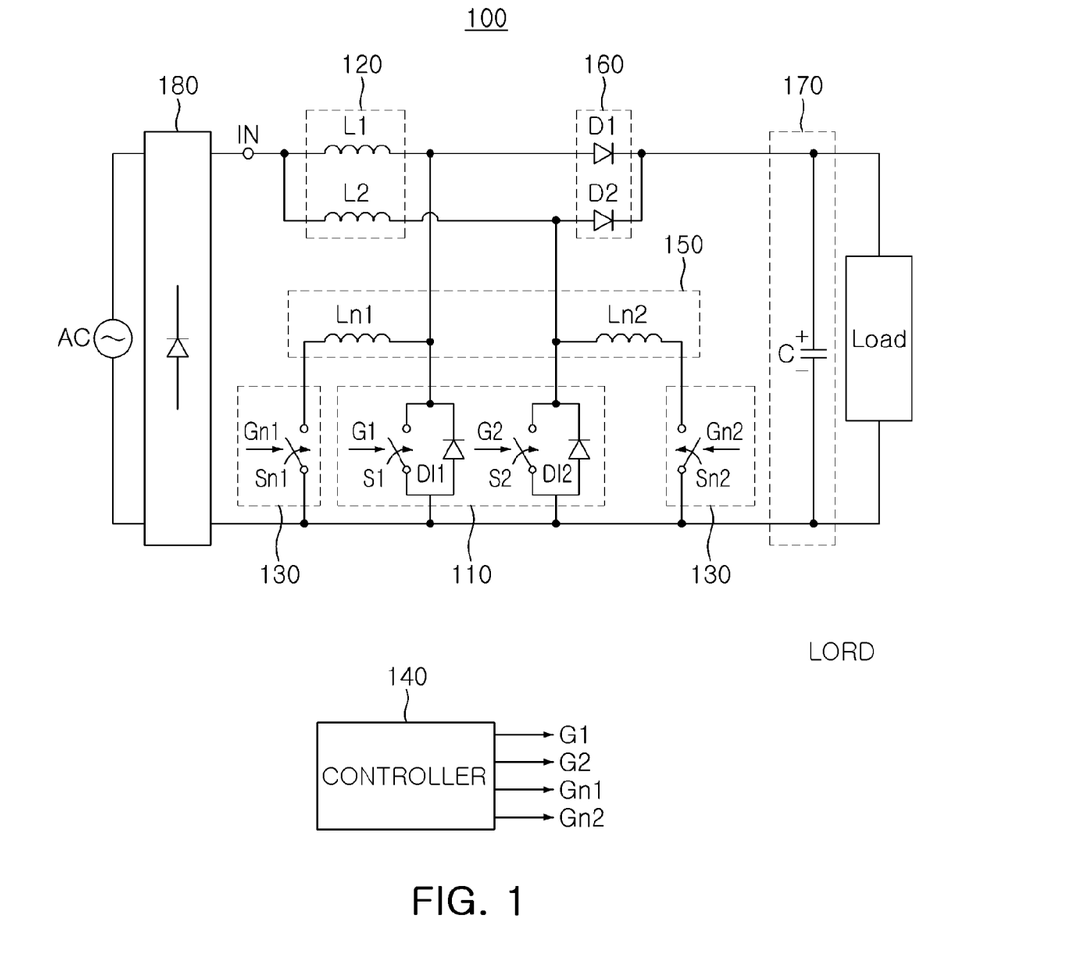
FIG. 1 is a schematic circuit diagram of a power factor correction circuit according to an embodiment of the present invention.

FIG. 1 is a schematic circuit diagram of a power factor correction circuit according to an embodiment of the present invention.

Referring to FIG. 1, a power factor correction circuit 100 according to an embodiment of the present invention may include a main switching unit 110, a main inductor unit 120, a snubber switching unit 130, and a controller 140. Also, the power factor correction circuit 100 according to an embodiment of the present invention may further include: a snubber inductor unit 150, a diode unit 160, and a smoothing unit 170, and a rectifying unit 180.

The main switching unit 110 may improve a power factor by regulating a phase difference between a voltage and a current of input power. The main switching unit 110 may include a first main switch S1 and a second main switch S2 performing a switching operation according to control signals G1 and G2 (i.e., PWM signals) having a 180-degree phase difference. In this case, the input power may be rectified power.

When a reverse current is applied to the first main switch S1 and the second main switch S2, first and second reverse current preventing diode DI1 and DI2 provide a bypass path from an anode to a cathode of each of the first and second reverse current preventing diodes DI1 and DI2, preventing a reverse current of the first and second main switches S1 and S2. The first and second reverse current preventing diodes DI1 and DI2 may be diodes formed in a body when the first and second main switches S1 and S2 are configured as transistors, but the present invention is not limited thereto and the first and second reverse current preventing diodes DI1 and DI2 may be separately added diodes.

The main inductor unit 120 may be connected between an input terminal IN to which input power is applied and the main switching unit 110 to accumulate or discharge energy according to a switching operation of the main switching unit 110. In detail, the main inductor unit 120 may include a first main inductor and a second main inductor L2. The first main inductor L1 may be connected between the input terminal IN and the first main switch S1 to accumulate or discharge power according to a switching operation of the first main switch S1, and the second main inductor L2 may be connected between the input terminal IN and the second main switch S2 to accumulate or discharge power according to a switching operation of the second main switch S2.

The snubber switching unit 130 may include first and second snubber switches Sn1 and Sn2 connected to the first main switches S1 and S2 in parallel. The first and second snubber switches Sn1 and Sn2 may perform a switching operation according to control signals Gn1 and Gn2 to provide zero-voltage turn-on conditions to the first and second main switches S1 and S2, respectively.

The first and second main switches S1 and S2 and the snubber switches Sn1 and Sn2 may be configured as one of an insulated gate bipolar transistor (IGBT), a metal oxide semiconductor field-effect transistor (MOS-FET), and a bipolar junction transistor (BJT), respectively.

The controller may generate control signals G1, G2, Gn1, and Gn2 for controlling a switching operation of the main switching unit 110 and the snubber switching unit 130. The first and second main switches S1 and S2 and the first and second snubber switches Sn1 and Sn2 may perform a switching operation according to the control signals G1, G2, Gn1, and Gn2, respectively.

Figure 3:
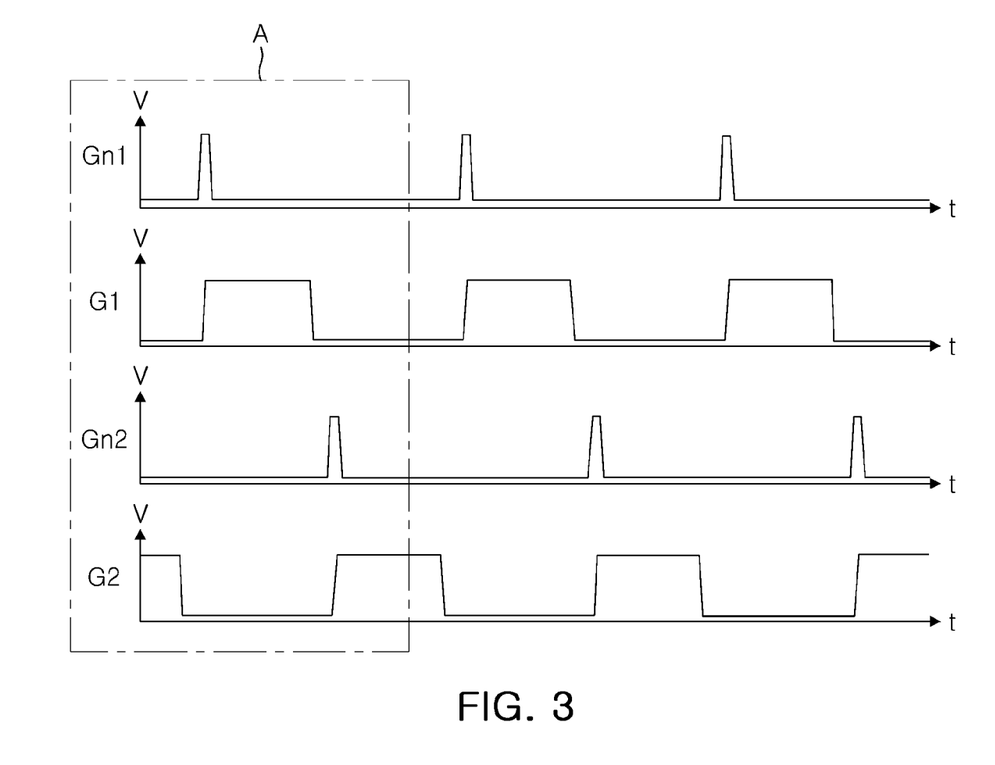
FIG. 3 is a graph of control signals generated by a controller employed in a power factor correction circuit according to an embodiment of the present invention.
Figure 4:
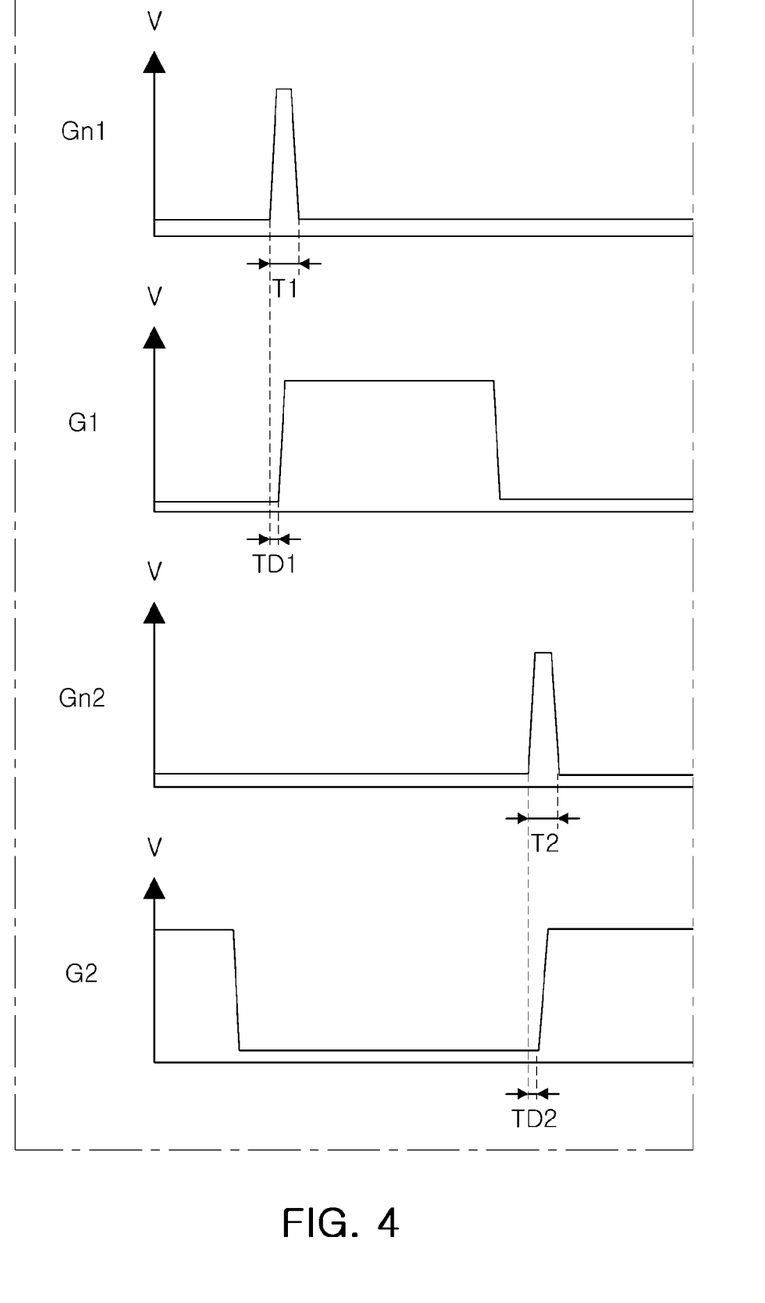
FIG. 4 is a graph showing portion 'A' of FIG. 3 enlarged.

FIG. 3 is a graph of control signals generated by a controller employed in the power factor correction circuit according to an embodiment of the present invention, and FIG. 4 is a graph showing an enlarged portion 'A' of FIG. 3. When the control signals G1, G2, Gn1, and Gn2 have a high level, the respective switches S1, S2, Sn1, and Sn2 are turned on, and when the control signals G1, G2, Gn1, and Gn2 have a low level, the respective switches S1, S2, Sn1, and Sn2 are turned off.

The first and second main switches S1 and S2 of the power factor correction circuit may perform a switching operation to regulate a phase difference between a voltage and a current of input power to improve a power factor of the input power, and here, the first and second snubber switches Sn1 and Sn2 bypass surplus power remaining after the first and second main switches S1 and S2 were switched on and off to a ground, to provide zero-voltage switching conditions to the first and second main switches S1 and S2. Accordingly, switching loss in the first and second main switches S1 and S2 may be removed.

As illustrated in FIGS. 3 and 4, the first and second snubber switches Sn1 and Sn2 may be turned on in advance of the first and second main switches S1 and S2 by first and second delay times TD1 and TD2, respectively, in order to form a transmission path of surplus power existing before the first and second main switches S1 and S2 are turned on. Here, the first and second snubber switches Sn1 and Sn2 may be in a turned-on state during first and second durations T1 and T2, and here, the first and second durations T1 and T2 may be set to be longer than the first and second delay times TD1 and TD2, whereby the first and second snubber switches Sn1 and Sn2 may be turned off before the first and second main switches S1 and S2 are turned off.

Here, the first duration T1 and the second duration T2 may be set as the same time intervals, and the first delay time TD1 and the second delay time TD2 may be set as the same time intervals.

Referring back to FIG. 1, the power factor correction circuit according to an embodiment of the present invention may further include the snubber inductor unit 150. The snubber inductor unit 150 may include first and second snubber inductors Ln1 and Ln2 provided between the first and second snubber switches Sn1 and Sn2 and the first and second main switches S1 and S2.

As discussed above, the first and second snubber switches Sn1 and Sn2 are turned on in advance of the first and second main switches S1 and S2 by a predetermined time interval, and in this case, in order to prevent a current having a high current level from being rapidly applied to the snubber switches Sn1 and Sn2, the first and second snubber inductors Ln1 and Ln2 may be provided.

The diode unit 160 may provide a transmission path for power discharged from the main inductor unit 120 according to a switching operation of the main switching unit 110. In detail, the diode unit 160 may include first and second diodes D1 and D2. The first and second diodes D1 and D2 may provide a transmission path for power discharged from the first and second main inductors L1 and L2 according to a switching operation of the first and second main switches S1 and S2, respectively.

The smoothing unit 170, connected to the load in parallel, may stabilize power output from the diode unit 160. The smoothing unit 170 may include a capacitor C.

The rectifying unit 180 may provide input power generated by rectifying alternating current (AC) power, to the main inductor unit 120.

Figure 2:
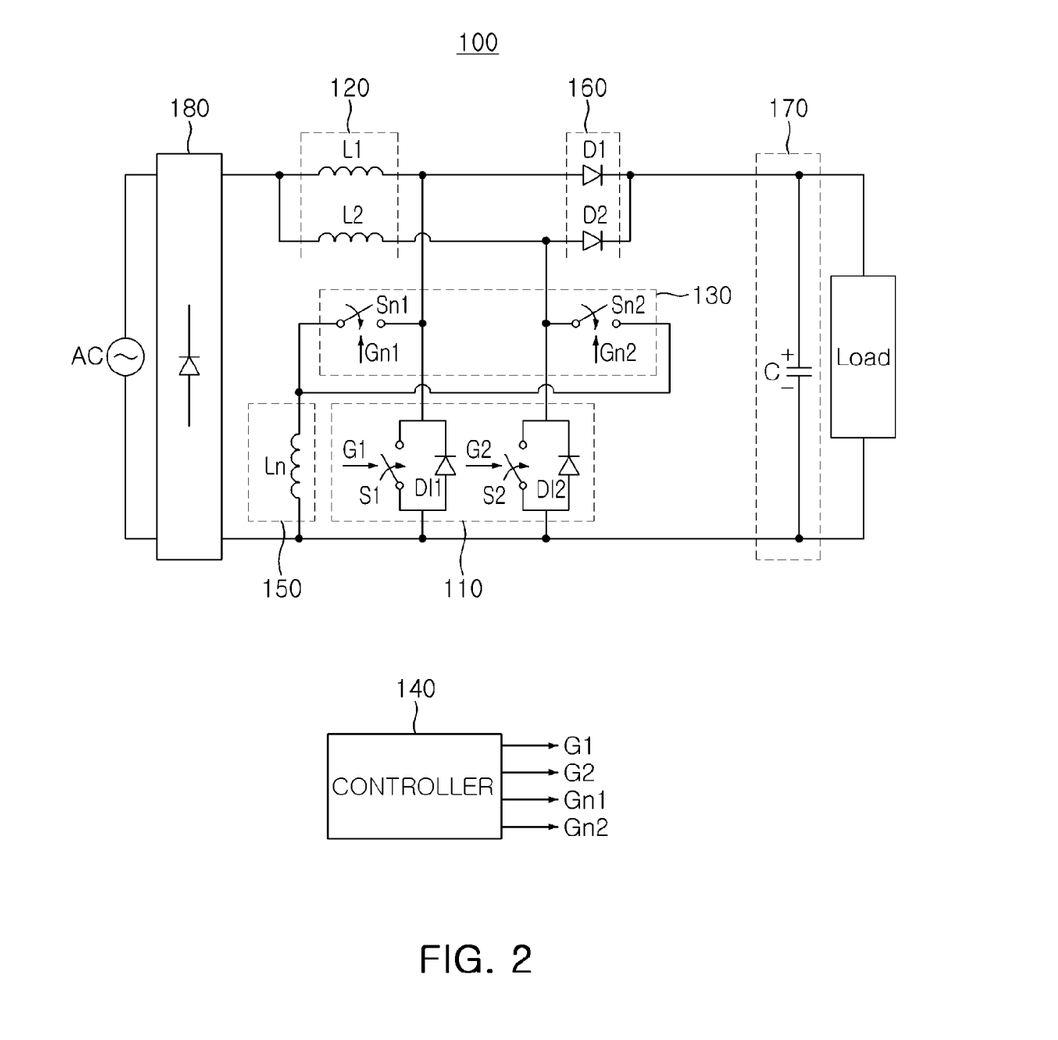
FIG. 2 is a schematic circuit diagram of a power factor correction circuit according to another embodiment of the present invention.

FIG. 2 is a schematic circuit diagram of a power factor correction circuit according to another embodiment of the present invention.

The power factor correction circuit 100 illustrated in FIG. 2 is the same as the power factor correction circuit 100 illustrated in FIG. 1, except for the snubber switching unit 130 and the snubber inductor unit 150, so a detailed description of the same configuration will be omitted.

In comparison to the snubber inductor unit 150 illustrated in FIG. 1 including two snubber inductors Ln1 and Ln2, the snubber inductor unit 150 illustrated in FIG. 2 includes only a single snubber inductor Ln. Since a relatively small amount of power is applied to the snubber inductor unit 150, even though the single inductor element is shared by the first and second snubber switches Sn1 and Sn2, a stable operation can be performed, and thus, the circuit configuration can be simplified.

Figure 5:
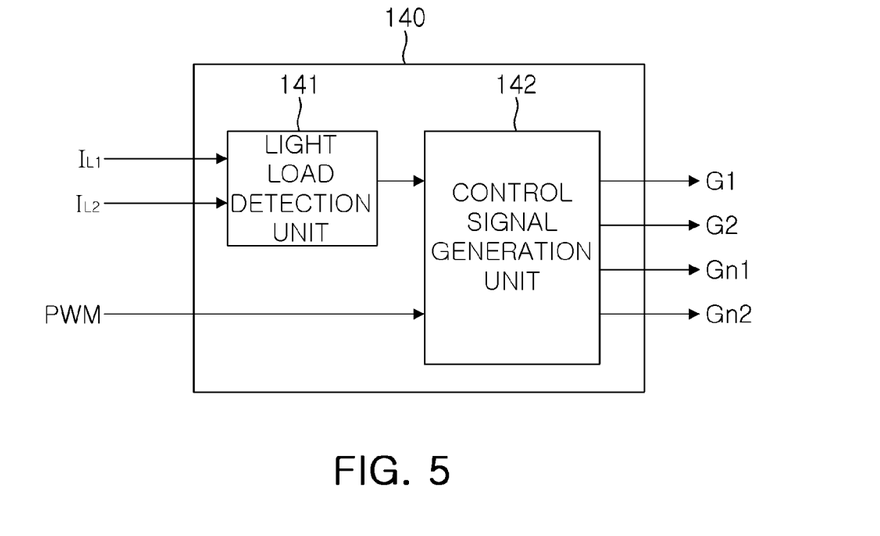
FIG. 5 is a block diagram of a controller according to an embodiment of the present invention.

FIG. 5 is a block diagram of the controller according to an embodiment of the present invention. The controller 140 will be described in detail with reference to FIGS. 1 and 5.

The controller 140 may control at least one of a first group set to include the first main switch S1 and the first snubber switch Sn1 and a second group set to include the second main switch S2 and the second snubber switch Sn2 according to a current flowing in the main inductor unit 120.

The power factor correction circuit 100 according to an embodiment of the present invention is implemented as a 2-phase interleaved power factor correction circuit. Thus, when a load connected to the output terminal is a light load, only one phase is operated, preventing an unnecessary waste of power and lengthening a life span of an overall system.

The controller 140 may compare a current level of a current flowing in the main inductor unit 120 with a current level of a pre-set reference current to detect whether a load connected to the output terminal is a light load. When the load is determined as a heavy load, the controller 140 may provide control to operate both two phases, and when the load is determined as a light load, the controller 140 may provide control to operate only one of the two phases.

In detail, the controller 140 may include a light load detection unit 141 comparing a current level of a current flowing in the first and second main inductors L1 and L2 with the current level of the pre-set reference current and a control signal generation unit 142 generating a control signal for controlling at least one of the first and second groups according to the detection results from the light load detection unit 141.

When both current levels of currents $I_{L1}$ and $I_{L2}$ flowing in the first and second main inductors L1 and L2 are equal to or higher than the current level of the reference current, the light load detection unit 141 may generate a heavy load signal, and when the current levels of currents $I_{L1}$ and $I_{L2}$ flowing in the first and second main inductors L1 and L2 are lower than the current level of the reference current, the light load detection unit 141 may generate a light load signal.

When the control signal generation unit 142 receives the heavy load signal, the control signal generation unit 142 may generate the control signals G1, G2, Gn1, and Gn2 as illustrated in FIGS. 3 and 4 and provide the same to the respective switches S1, S2, Sn1, and Sn2. In detail, the control signal generation unit 142 may provide the control signals G1 and G2 (i.e., PWM signals) having a 180-degree phase difference to the first main switch S1 and the second main switch S2, and provide the control signals Gn1 and Gn2 for controlling the first snubber switch Sn1 and the second snubber switch Sn2 to be turned on earlier in advance by the first delay time TD1 and the second delay time TD2 than a timing at which the first main switch S1 and the second main switch S2 are turned on, respectively. In this case, both of the two phases are operated, so the currents $I_{L1}$ and $I_{L2}$ flowing in the first and second main inductors L1 and L2 may have a 180-degree phase difference.

Unlike the foregoing case, however, when the control signal generation unit 142 receives a light load signal, the control signal generation unit 142 may generate control signals G1, G2, Gn1, and Gn2 for controlling the first and second groups to alternately operate according to a pre-set period. Namely, The control signal generation unit 142 may generate the control signals G1 and Gn1 for controlling the first group during a first period, generate the control signals G2 and Gn2 for controlling the second group during a second period, and generate the control signals G1 and Gn1 for controlling the first group during a third period, and this process may be repeatedly performed each time the period is changed.

Figure 6:
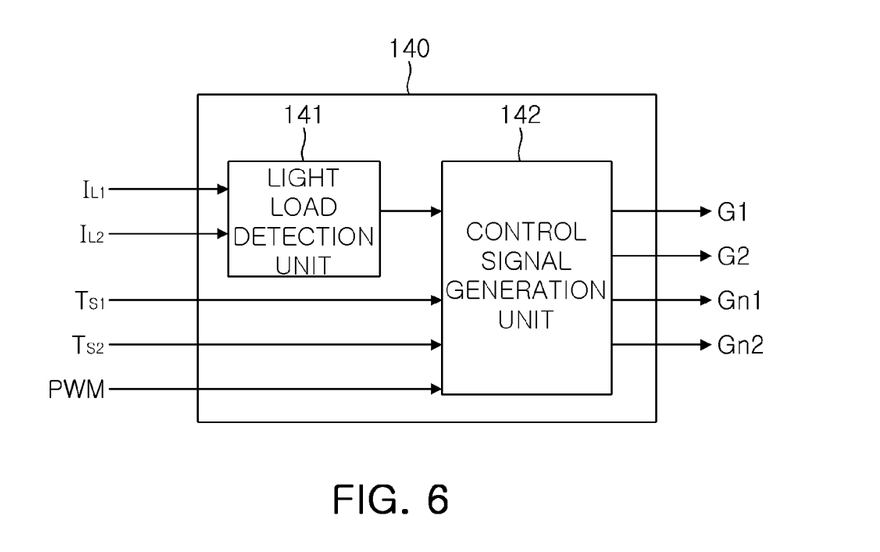
FIG. 6 is a block diagram of a controller according to another embodiment of the present invention.

FIG. 6 is a block diagram of a controller according to another embodiment of the present invention. Unlike the controller 140 of FIG. 5, the controller 140 of FIG. 6 may control at least one of the first group set to include the first main switch S1 and the first snubber switch Sn1 and the second group set to include the second main switch S2 and the second snubber switch Sn2 according to currents $IL_1$ and $IL_2$ flowing in the first and second main conductors L1 and L2 and temperatures $T_{s1}$ and $T_{s2}$ of the first and second main switches S1 and S2.

The light load detection unit 141 of FIG. 6 is the same as the light load detection unit 141 of FIG. 5, so a detailed description thereof will be omitted.

When the control signal generation unit 142 receives the heavy load signal, the control signal generation unit 142 may generate the control signals G1, G2, Gn1, and Gn2 as illustrated in FIGS. 3 and 4 and provide the same to the respective switches S1, S2, Sn1, and Sn2. In detail, the control signal generation unit 142 may provide the control signals G1 and G2 (i.e., PWM signals) having a 180-degree phase difference to the first main switch S1 and the second main switch S2, and provide the control signals Gn1 and Gn2 for controlling the first snubber switch Sn1 and the second snubber switch Sn2 to be turned on earlier in advance by the first delay time TD1 and the second delay time TD2 than a timing at which the first main switch S1 and the second main switch S2 are turned on, respectively. In this case, both of the two phases are operated, so the currents $I_{L1}$ and $I_{L2}$ flowing in the first and second main inductors L1 and L2 may have a 180-degree phase difference.

Unlike the foregoing case, however, when the control signal generation unit 142 receives a light load signal, the control signal generation unit 142 may generate a control signal for controlling one of the first and second groups to operate, and when a temperature of a main switch of one of the first and second groups is higher than a pre-set reference temperature, the control signal generation unit 142 may generate a control signal for controlling the other of the first and second groups to operate. For example, when the control signal generation unit 142 controls the first group to operate in case that it receives a light load signal, the control signal generation unit 142 may generate the control signals G1 and Gn1. Accordingly, a one phase power factor correction operation is performed by the first main switch S1 and the first snubber switch Sn1, and as the one phase power factor correction operation is performed by the first main switch S1 and the first snubber switch Sn1, the temperature $T_{S1}$ of the first main switch S1 is gradually increased. Here, when the temperature $T_{S1}$ of the first main switch S1 is equal to or higher than the pre-set reference temperature, the control signal generation unit 142 may generate the control signals G2 and Gn2 to operate the second group, and accordingly, a one phase power factor correction operation is performed by the second main switch S2 and the second snubber switch Sn2. This process may be repeatedly performed.

As set forth above, according to embodiments of the invention, since zero-voltage turn-on conditions are provided to the power factor correction switches, switching loss can be removed. In addition, when a light load is detected, the power factor correction circuit is driven to operate by a single phase, power and power efficiency and power factor correction efficiency can be increased and a life span of the overall system can be lengthened.

While the present invention has been shown and described in connection with the embodiments, it will be apparent to those skilled in the art that modifications and variations can be made without departing from the spirit and scope of the invention as defined by the appended claims.

What is claimed is:

1. A power factor correction circuit comprising:
a main switching unit including a first main switch and a second main switch performing a switching operation to regulate a phase difference between a current and a voltage of input power, respectively;
a main inductor unit including a first main inductor and a second main inductor accumulating or discharging energy according to a switching operation of each of the first main switch and the second main switch;
a snubber switching unit including a first snubber switch and a second snubber switch providing zero-voltage turn-on conditions to the first main switch and the second main switch, respectively; and
a controller controlling a switching operation of the main switching unit and the snubber switching unit,
wherein the controller controls at least one of a first group set to include the first main switch and the first snubber switch and a second group set to include the second main switch and the second snubber switch according to a current flowing in the main inductor unit.

2. The power factor correction circuit of claim 1, wherein the controller controls the first and second snubber switches to be in a turned-on state during pre-set first and second durations and the first and second main switches to be turned on when pre-set first and second delay times, starting from the turned-on timing of each of the first and second snubber switches, have lapsed.

3. The power factor correction circuit of claim 2, wherein the first and second durations are longer than the first and the second delay times.

4. The power factor correction circuit of claim 1, wherein the controller comprises:
a light load detection unit comparing current levels of currents flowing in the first and second main inductors with a current level of a pre-set reference current; and
a control signal generation unit generating a control signal for controlling at least one of the first and second groups according to detection results from the light load detection unit.

5. The power factor correction circuit of claim 4, wherein when the current levels of the currents flowing in the first and second main inductors are equal to or higher than the current level of the reference current, the light load detection unit generates a heavy load signal, and
when a current level of at least one of the currents flowing in the first and second main inductors is lower than the current level of the reference current, the light load detection unit generates a light load signal.

6. The power factor correction circuit of claim 5, wherein when the heavy load signal is received, the control signal generation unit generates a control signal for controlling the first and second groups such that currents flowing in the first and second inductors have a 180-degree phase difference, and
when the light load signal is received, the control signal generation unit controls the first and second groups to alternately operate according to a pre-set period.

7. The power factor correction circuit of claim 1, further comprising a snubber inductor unit including at least one snubber inductor regulating amounts of currents flowing in the first and second snubber switches.

8. The power factor correction circuit of claim 1, further comprising a diode unit providing a transmission path for power discharged from the main inductor unit according to a switching operation of the main switching unit.

9. The power factor correction circuit of claim 1, further comprising a smoothing unit stabilizing power transmitted from the diode unit.

10. The power factor correction circuit of claim 1, further comprising a rectifying unit providing the input power generated by rectifying AC power to the main inductor unit.

11. A power factor correction circuit comprising:
a main switching unit including a first main switch and a second main switch performing a switching operation to regulate a phase difference between a current and a voltage of input power, respectively;
a main inductor unit including a first main inductor and a second main inductor accumulating or discharging energy according to a switching operation of each of the first main switch and the second main switch;
a snubber switching unit including a first snubber switch and a second snubber switch providing zero-voltage turn-on conditions to the first main switch and the second main switch, respectively; and
a controller controlling a switching operation of the main switching unit and the snubber switching unit,
wherein the controller controls at least one of a first group set to include the first main switch and the first snubber switch and a second group set to include the second main switch and the second snubber switch according to a current flowing in the main inductor unit and a temperature of the main switching unit.

12. The power factor correction circuit of claim 11, wherein the controller controls the first and second snubber switches to be in a turned-on state during pre-set first and second durations and the first and second main switches to be turned on when pre-set first and second delay times, starting from the turned-on timing of each of the first and second snubber switches, have lapsed.

13. The power factor correction circuit of claim 12, wherein the first and second durations are longer than the first and the second delay times.

14. The power factor correction circuit of claim 11, wherein the controller comprises:
a light load detection unit comparing current levels of currents flowing in the first and second main inductors with a current level of a pre-set reference current; and
a control signal generation unit generating a control signal for controlling at least one of the first and second groups according to detection results from the light load detection unit and a temperature of the main switching unit.

15. The power factor correction circuit of claim 14, wherein when the current levels of the currents flowing in the first and second main inductors are equal to or higher than the current level of the reference current, the light load detection unit generates a heavy load signal, and
when a current level of at least one of the currents flowing in the first and second main inductors is lower than the current level of the reference current, the light load detection unit generates a light load signal.

16. The power factor correction circuit of claim 15, wherein when the heavy load signal is received, the control signal generation unit generates a control signal for controlling the first and second groups such that currents flowing in the first and second inductors have a 180-degree phase difference, and
when the light load signal is received, the control signal generation unit controls one of the first and second groups such that when a temperature of a main switch of one of the first and second groups is higher than a pre-set reference temperature, the control signal generation unit generates a control signal for controlling the other of the first and second groups to operate.

17. The power factor correction circuit of claim 11, further comprising a snubber inductor unit including at least one snubber inductor regulating amounts of currents flowing in the first and second snubber switches.

18. The power factor correction circuit of claim 11, further comprising a diode unit providing a transmission path for power discharged from the main inductor unit according to a switching operation of the main switching unit.

19. The power factor correction circuit of claim 11, further comprising a smoothing unit stabilizing power transmitted from the diode unit.

20. The power factor correction circuit of claim 11, further comprising a rectifying unit providing the input power generated by rectifying AC power to the main inductor unit.

* * * * *